United States Patent [19]

Harada et al.

[11] Patent Number: 4,504,640
[45] Date of Patent: Mar. 12, 1985

[54] PROCESS FOR PRODUCING MONOALLYLAMINE POLYMER

[75] Inventors: Susumu Harada, Koriyama; Sakuro Hasegawa, Fujisawa, both of Japan

[73] Assignee: Nitto Boseki Co., Ltd., Fukushima, Japan

[21] Appl. No.: 379,983

[22] Filed: May 19, 1982

[51] Int. Cl.$^3$ .......................... C08F 4/04; C08F 26/02
[52] U.S. Cl. .................................... 526/193; 526/204; 526/212; 526/216; 526/218; 526/276; 526/281; 526/291; 526/310; 526/218.1; 526/219; 526/219.1; 526/219.2; 526/219.3; 526/219.5
[58] Field of Search ............... 526/193, 212, 216, 218, 526/276, 281, 291, 310, 204

[56] References Cited

U.S. PATENT DOCUMENTS

| | | | |
|---|---|---|---|
| 2,456,428 | 12/1948 | Parker | 260/80 |
| 2,599,299 | 6/1952 | Upson | 260/192 |
| 2,599,300 | 6/1952 | Upson | 260/94.9 |
| 2,605,260 | 7/1952 | Johnson | 260/152 |
| 2,662,875 | 12/1953 | Chaney | 526/310 |
| 2,744,105 | 5/1956 | Barney | 260/192 |
| 3,062,798 | 11/1962 | Lovett | 260/89.7 |
| 3,992,369 | 11/1976 | Moore | 526/218 |
| 4,053,512 | 10/1977 | Panzer et al. | 260/567.6 P |
| 4,329,441 | 5/1982 | Bergthaller | 526/291 |

OTHER PUBLICATIONS

Allyl Compounds and Their Polymers, Wiley-Interscience, pp. 29–30, 523–524, (1973).
R. C. Laible, Chem. Rev. 58, No. 5, 807–843, (1958).

*Primary Examiner*—Harry Wong, Jr.
*Attorney, Agent, or Firm*—Bert J. Lewen

[57] ABSTRACT

By polymerizing an inorganic acid salt of monoallylamine in a polar solvent in the presence of a radical initiator having, in its molecule, an azo group and a group having cationic nitrogen atom, a polymer of monoallylamine having a high degree of polymerization can be obtained in high yield.

4 Claims, 1 Drawing Figure

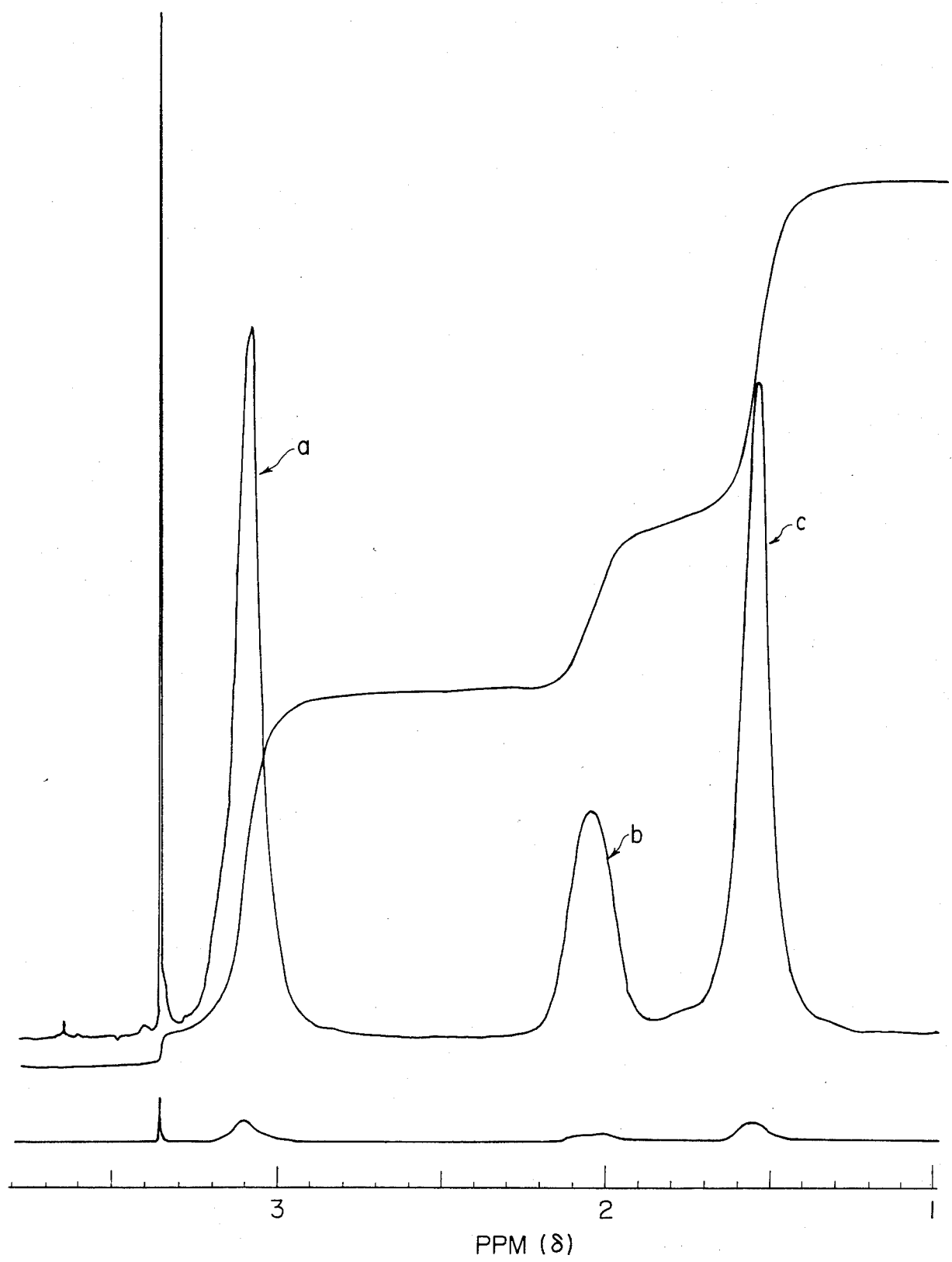
FIG.

ns of monoallylamine with a radical type catalyst, only referring to a process of polymerizing allyl cyanide with benzoyl peroxide in the presence of zinc chloride and a process of polymerizing allylmercaptan with hydrogen peroxide in the presence of calcium chloride.

PROCESS FOR PRODUCING MONOALLYLAMINE POLYMER

BACKGROUND OF THE INVENTION

This invention relates to a process for producing a polymer of monoallylamine ($CH_2=CH-CH_2NH_2$).

As is well known, allyl compounds are difficult to polymerize with usual radical initiators and they only yield polymers having a low degree of polymerization in low yield.

This is explained as being due to the occurrence of the self-termination reaction between allylic hydrogen atoms and radicals, and this reaction is usually called "allylic degradative chain transfer".

This fact is a common knowledge of polymer chemists, and is mentioned in many papers and textbooks [cf. for example, C. E. Schildknecht, Allyl Compounds and their Polymers, Willey-Interscience, 1973, pp. 29–30; and R. C. Laible, Chem. Rev. 58, (5), 807–843 (1958)].

Such is unexceptionally applicable also to monoallylamine which is a kind of allyl compound. Thus, monoallylamine hardly polymerizes with radical or ionic initiators, and only a few examples of polymerization have been reported in which the polymerization takes place under the following special conditions (pp. 523–524 of the above-mentioned textbook):

(1) The process of obtaining a brown-colored resinous polymonoallylamine (hereinafter simply referred to as "polyallylamine") by gas phase polymerization using tetrafluorohydrazine as a catalyst (U.S. Pat. No. 3,062,798);

(2) The process of obtaining a black-brown colored, resinous polyallylamine having a molecular weight of 950–1,000 by adding a small amount of water to monoallylamine hydrochloride to bring it into a state of aqueous melt and then polymerizing it at 80°–85° C. while adding hydrogen peroxide in small portions [V. V. Zycova et al., Tr. Inst. Khim. Nauk, Akad. Nauk Kaz. SSR 11, 89–94 (1964); Chem. Abst. 61. 14855 (1964)].

The above-mentioned processes 1 and 2 are examples of polymerization of monoallylamine in which catalysts such as radical initiators are used. However, in both examples, no polymer having a high degree of polymerization is obtained.

The following radiation polymerization processes have also been proposed as processes for polymerizing monoallylamine. The monoallylamine polymers obtained monoallylamine. The monoallylamine polymers obtained by these processes have a higher degree of polymerization than that of the polymers obtained by the processes using radical type catalysts.

(3) The process of polymerizing monoallylamine in a protic acid (sulfuric acid, phosphoric acid or hydrochloric acid) while irradiating it with gamma rays or while irradiating it with ultraviolet rays in the presence of hydrogen peroxide [V. A. Kabanov et al., Vysokomol. Soed., 18, No. 9, 1957–1962 (1976); 18, No. 10, 2233–2238 (1976)].

(4) The process of irradiating monoallylamine, allyl cyanide or allylmercaptan with a variety of radiations (gamm rays, electron beams, X rays, ultraviolet rays) in the presence of an inorganic acid or an inorganic acid salt of a metal belonging to Group I or II of the periodic table (L. S. Polak, V. A. Kabanov et al., USSR Pat. No. 296,423). Though this USSR patent includes polymerization processes using radical type catalysts, examples in the patent include no case of polymerizing monoallylamine with a radical type catalyst, only referring to a process of polymerizing allyl cyanide with benzoyl peroxide in the presence of zinc chloride and a process of polymerizing allylmercaptan with hydrogen peroxide in the presence of calcium chloride.

On the other hand, since polyallylamine is a quite interesting polymer, there have been made attempts to produce polyallylamine or its N-alkyl-substituted derivatives by the chemical modification of other vinyl polymers. As examples of such attempts, the followings can be referred to:

(5) The process of producing polyallylamine by hydrogenating polyacrylonitrile latex (U.S. Pat. No. 2,456,428);

(6) The process of synthesizing polyallylamine by the reduction of polyacrolein-oxime [Yoshikazu Hatsuhama et al., Kogyo Kagaku Zasshi 64, No. 3,595 (1961)];

(7) The process of obtaining a polymer of allyltrimethylammonium chloride by reacting an allyl chloride polymer having a molecular weight of about 900 with trimethylamine (U.S. Pat. No. 4,053,512); and (8) A process of producing poly-(N,N-dimethylallylamine) by reducing a polymer of N,N-dimethylacrylamide (the same patent as above).

Among the eight processes for producing monoallylamine polymer mentioned above, the radiation polymerization processes with gamma rays in protic solvents mentioned in 3 to 4 are relatively preferable. As is well known, however, radiation polymerization is not the best process for producing a large amount of polymer, and at the present stage there is no case of industrially producing a polymer by the radiation polymerization process. Thus, polyallylamine is not produced industrially even today, whereas monoallylamine has been industrially produced from many years ago.

SUMMARY OF THE INVENTION

An object of this invention is to provide an industrially excellent process for polymerizing monoallylamine by using a radical initiator.

Another object of this invention is to provide a process for producing a polymer of monoallylamine, having a high degree of polymerization, by using a radical initiator.

Other and further objects, features and advantages of this invention will appear more fully from the following description.

The present inventors have searched for a process for producing a polymer having a high degree of polymerization in high yield by radical-polymerizing monoallylamine under industrially readily practicable conditions. As the result, they discovered a surprising fact that, if a radical initiator having an azo group and a group having cationic nitrogen atom in its molecule is used, an inorganic acid salt of monoallylamine can be polymerized in a polar solvent quite easily and thereby a polymer having a high degree of polymerization can be obtained in a high yield.

Thus, this invention consists of a process for producing a polymer of monoallylamine which comprises polymerizing an inorganic acid salt of monoallylamine in a polar solvent in the presence of a radical initiator having an azo group and a group having cationic nitrogen atom in its molecule.

BRIEF DESCRIPTION OF THE DRAWING

FIG. 1 is a proton nuclear magnetic resonance spectrum of a monoallylamine polymer obtained by this invention.

DETAILED DESCRIPTION OF THE PREFERRED EMBODIMENTS

It an inorganic acid salt of monoallylamine is subjected to a polymerization treatment in a polar solvent by using a radical initiator having an azo group and a group having cationic nitrogen atom in its molecule, the polymerization readily progresses to give a monoallylamine polymer having a high degree of polymerization in high yield. Though the reason for this phenomenon is not known, it is thought that, in the process of this invention, both monomer (inorganic acid salt of monoallylamine) and initiator have an electrical charge in the polymerization system. This hypothesis is supported by the fact that nonionic allyl compounds such as allyl alcohol, allyl cyanide and the like hardly polymerize when subjected to a polymerization treatment under the same conditions as above.

As preferable examples of the inorganic acid salt of monoallylamine used in this invention, hydrochloric acid salt, sulfuric acid salt, sulfurous acid salt, phosphoric acid salt and the like can be referred to.

The polymerization is carried out in a polar solvent, of which examples include water, inorganic acids (hydrochloric acid, sulfuric acid, phosphoric acid and polyphosphoric acid), their aqueous solutions, organic acids (formic acid, acetic acid, propionic acid, lactic acid and the like), their aqueous solutions, alcohols, dimethyl sulfoxide, dimethylformamide, and aqueous solutions of inorganic acid salts (zinc chloride, calcium chloride, magnesium chloride and the like).

In carrying out the polymerization, the above-mentioned inorganic acid salts of allylamine are usually employed in the form of an isolated crystal. However, it is also allowable to form the salt in situ by adding monoallylamine and inorganic acid into the above-mentioned polar solvent. It is needless to say that, when an inorganic acid or its aqueous solution is used as the medium of polymerization, a predetermined quantity of monoallylamine may be added to the acid or its aqueous solution and then it may be polymerized directly.

The initiator used in this invention is a radical initiator having an azo group and a group having cationic nitrogen atom in its molecule. With consideration of the difficulty or easiness of synthesis, there are practically used inorganic or organic acid salts of azo compounds; said inorganic or organic acid salts including hydrochloride, sulfate, phosphate, alkylsulfate, paratoluene sulfonate, formate, acetate and propionate and said azo compounds being represented by the following general formula [I];

wherein at least one, preferably both of $R_1$ and $R_2$ is a group having a cationizable nitrogen atom selected from the group consisting of aminoalkyl, aminoaryl, amidinylalkyl, amidinylaryl, aminoalkaryl, aminoaralkyl, amidinylaralkyl, amidinylalkaryl, cyanoaminoalkyl and cyanoaminoalkaryl. When only one of $R_1$ and $R_2$ is said group having a cationizable nitrogen atom, the other is a group selected from the group consisting of alkyl, aryl, alkaryl, aralkyl, cyanoalkyl, cyanoaryl, cyanoalkaryl and cyanoaralkyl. Optionally, $R_1$ and $R_2$, taken together, may form a single alkylene group represented by the following general formula (II):

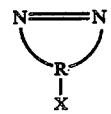

wherein R is alkylene, alkylalkylene or arylalkylene, linked to nitrogen atoms of an azo group to form an azo group-containing ring, and X is a group having a cationizable nitrogen atom.

Among the initiators represented by general formula (I), particularly preferable are the compounds having a secondary or tertiary carbon atom adjacent to azo group, of which typical examples are as follows:

2,2'-diamidinyl-2,2'-azopropane hydrochloride, 2,2'-diamidinyl-2,2'-azobutane hydrochloride, 2,2'-diamidinyl-2,2'-azopentane hydrochloride, 2,2'-bis(N-phenylamidinyl)-2,2'-azopropane hydrochloride, 2,2'-bis(N-phenylamidinyl)-2,2'-azobutane hydrochloride, 2,2'-bis(N,N-dimethylamidinyl)-2,2'-azopropane hydrochloride, 2,2'-bis(N,N-dimethylamidinyl)-2,2'-azobutane hydrochloride, 2,2'-bis(N,N-diethylamidinyl)-2,2'-azopropane hydrochloride, 2,2'-bis(N,N-diethylamidinyl)-2,2'-azobutane hydrochloride, 2,2'-bis(N-n-butylamidinyl)-2,2'-azopropane hydrochloride, 2,2'-bis(N-n-butylamidinyl)-2,2'-azobutane hydrochloride, 3,3'-bis(N,N-di-n-butyl amidinyl)-3,3'-azopentane hydrochloride;

2,2'-azo-bis(2-methyl-4-diethylamino)butyronitrile hydrochloride, 2,2'-azo-bis(2-methyl-4-dimethylamino)-butyronitrile hydrochloride, quaternary ammonium salt type azonitriles produced by quaternarizing 2,2-azo-bis(2-methyl-4-diethylamino)-butyronitrile or 2,2'-azo-bis(2-methyl-4-dimethylamino)-butyronitrile with dimethyl sulfate, methyl p-toluenesulfonate or the like;

3,5-diamidinyl-1,2-diazo-1-cyclopentene hydrochloride, 3-methyl-3,5-diamidinyl-1,2-diazo-1-cyclopentene hydrochloride, 3-ethyl-3,5-diamidinyl-1,2-diazo-1-cyclopentene hydrochloride, 3,5-dimethyl-3,5-diamidinyl-1,2-diazo-1-cyclopentene hydrochloride, 3,6-diamidinyl-1,2-diazo-1-cyclohexene hydrochloride, 3-phenyl-3,5-diamidinyl-1,2-diazo-1-cyclopentene hydrochloride, 3,5-diphenyl-3,5-diamidinyl-1,2-diazo-1-cyclopentene hydrochloride and the like.

The above-mentioned radical initiators having an azo group and a group having a cationic nitrogen atom are known compounds, and the processes for producing them and examples of polymerization of unsaturated compounds using them as initiator are disclosed in U.S. Pat. Nos. 2,599,299, 2,599,300, 2,605,260 and 2,744,105. However, in the above-mentioned examples of polymerization using these radical initiators, ethylene, acrylonitrile, chlorobutadiene or the like is used as the unsaturated compound to be polymerized, and these unsaturated compounds are different from monoallylamine in chemical structure and properties. Therefore, these U.S. patents do not suggest that monoallylamine can be polymerized similarly.

The amount of the initiator used in this invention is 0.1–10% by weight and usually 1–6% by weight, based on the weight of inorganic acid salt of monoallylamine.

Though the temperature of polymerization varies depending on the chemical structure of initiator, it is 30°–100° C. and usually 40°–70° C. The time period of polymerization is usually 100 hours or less.

As for the concentration of the starting monomer, a higher concentration is more desirable in the scope of its solubility.

Since the polymerization is retarded by oxygen in the air to some extent, it is preferably carried out in an inert gas such as nitrogen.

As will be mentioned later in comparative examples, some of the radical initiators other than the radical initiators used in this invention have an ability to polymerize inorganic acid salt of monoallylamine in polar solvent to some extent. However, they all give a low rate of polymerization and require a high concentration of initiator, and the polyallylamine obtained therewith has a low degree of polymerization. Therefore, the polymerization of inorganic acid salt of monoallylamine with such radical initiators other than the radical initiators used in this invention do not exceed the hitherto believed common knowledge that monoallyl compounds are hardly polymerized by radical initiators.

Examples of this invention and comparative examples are mentioned below. In these examples, monoallylamine (hereinafter simply referred to as MAA) manufactured by Shell Chemical Co., USA was used as starting monomer. It was dried on granular caustic soda and rectified under a stream of nitrogen, and the fraction having a boiling point of 52.5°–53° C. was used for the polymerization. By gas chromatography, it was revealed that this fraction contained neither diallylamine nor triallylamine.

EXAMPLE 1

This is an example of the production of polyallylamine hydrochloride by the polymerization of MAA hydrochloride (hereinafter simply referred to as MAA-HCl) in aqueous solution.

Into 1.1 kg of concentrated hydrochloric acid (35% by weight) was dropped 570 g (10 moles) of MAA with stirring at 5°–10° C. while cooling the acid with ice. After completion of the dropping, water and excessive hydrogen chloride were distilled off by means of rotary evaporator at 60° C. under a reduced pressure of 20 mm Hg to obtain a white crystalline product. It was dried over drying silica gel at 80° C. under a reduced pressure of 5 mm Hg to obtain 980 g of MAA-HCl. This MAA-HCl contained about 5% water.

Into a 2 liter round bottomed flask equipped with a stirrer, a thermometer, a reflux condenser and a nitrogen gas inlet tube were introduced 590 g (6 moles) of the above-mentioned MAA-HCl and 210 g of distilled water. By stirring and dissolving the MAA-HCl, a 70% aqueous solution of MAA-HCl was obtained. While introducing nitrogen gas, the solution was heated to 50° C. Then, as azo initiator of this invention having a group which includes a cationic nitrogen atom, 14 g of 2,2′-bis(N-phenylamidinyl)-2,2′-azopropane dihydrochloride (hereinafter simply referred to as "Initiator-1") was added in the form of a solution in 20 ml of distilled water. About 2 hours after the addition, generation of heat started, and therefore the mixture was cooled with stirring to keep it at 48°–52° C. After the generation of the heat ended about 10 hours after the addition of initiator, stirring was stopped and the mixture was subjected to polymerization at 50±1° C. for an additional 60 hours. Thus, a colorless, transparent and viscous solution was obtained. When this solution was poured into a large amount of methanol, a white colored polymer precipitated. The precipitate was collected by filtration using a glass filter and washed with methanol. The precipitate thus obtained was finely crushed without drying it and then it was extracted with methanol for 15 hours by means of Soxhlet extractor to remove the unpolymerized MAA-HCl. After the extraction, it was dried at 50° C. under reduced pressure to obtain 533 g (90%) of a polymer. This polymer was investigated by elementary analyses and proton nuclear magnetic resonance spectrometry ($D_2O$, 270 MHz).

Proton nuclear magnetic resonance spectrum of the polymer thus obtained is shown in FIG. 1, wherein a, b and c were judged to represent the absorption peaks of the protons to which the same marks are attached in the following general formula, so that this polymer was identified as polyallylamine hydrochloride (hereinafter simply referred to as "PAA-HCl):

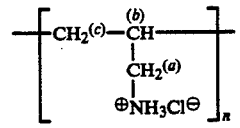

The results of elementary analyses revealed that PAA-HCl adsorbed about one molecule of water per 4 monomer units.

Found (%): C: 36.71, H: 8.80, N: 13.78; Calcuated for $C_3H_8NCl$ (%): C: 38.51, H: 8.62, N: 14.97; Calculated for $C_3H_8NCl \cdot \frac{1}{4} H_2O$ (%): C: 36.74, H: 8.74, N: 14.28.

As determined by the measurement of osmotic pressure in aqueous solution of sodium chloride, this PAA-HCl had a number-average molecular weight ($\overline{M}_n$) of 8,500 (number-average degree of polymerization: 91).

This PAA-HCl was readily soluble in water and aqueous acids, and was insoluble in organic solvents. Its aqueous solution exhibited a typical viscosity behavior of polyelectrolyte.

When heated in the presence of air, this PAA-HCl decomposed at 300° C. or above without melting.

Then, free polyallylamine (PAA) was prepared from this PAA-HCl. Thus, 30 g of PAA-HCl was dissolved into 270 g of distilled water and passed through strongly basic ion exchange resin (Amberlite IRA-402) to remove the hydrochloric acid, after which the filtrate was freeze-dried to obtain 16.5 g of white-colored PAA. This PAA was readily soluble in water and methanol, swellable in dimethyl sulfoxide and pyridine and insoluble in other usual organic solvents. When allowed to stand in the air, this PAA absorbed carbon dioxide and water to form a carbonate.

EXAMPLE 2

Using 2,2′-diamidinyl-2,2′-azopropane dihydrochloride (Initiator-2) in place of Initiator-1 used in Example 1, polymerization was carried out by the same procedure as in Example 1, except that an aqueous solution obtained by dissolving 14 g of Initiator-2 into 30 ml of distilled water was added not at once at the start of polymerization but in two portions, firstly at the start of polymerization and secondly 30 hours after it. Subsequently, the reaction mixture was treated in the same manner as in Example 1 to obtain 503 g (85%) of PAA-HCl. $\overline{M}_n$ of this polymer was 7,500.

EXAMPLE 3

Into 31 g of 60% aqueous solution of zinc chloride was dissolved 49 g (½ mole) of MAA-HCl synthesized by the procedure mentioned in Example 1. The solution was introduced into a stoppered 100 ml Erlenmeyer flask and heated to 50° C. Then, 1.4 g of Initiator-1 was added as a powder and dissolved, after which polymerization was carried out for 40 hours at a temperature of 50°±1° C. Thus, the solution solidified to give a colorless, transparent, rubbery product. It was dissolved in 200 g of distilled water and then poured into a large amount of methanol. The resulting precipitate was collected by filtration, extracted with methanol by means of Soxhlet extractor and then dried at 50° C. under reduced pressure to obtain 47 g (96%) of PAA-HCl. $\overline{M}_n$ of this polymer was 9,500 (degree of polymerization: 102).

EXAMPLE 4

Into the 2 liter polymerization vessel used in Example 1 equipped with a dropping funnel in place of the nitrogen inlet tube was introduced 613 g (5 moles) of 80% sulfuric acid, into which was dropped 285 g (5 moles) of MAA while cooling and stirring the sulfuric acid. After dropping it, the mixture was heated to 50° C. to obtain a homogeneous solution. To this solution was added a solution obtained by dissolving 8.6 g of Initiator-1 in 20 ml of distilled water. Subsequently, polymerization was carried out for 48 hours while keeping the mixture at 50°±2° C. After the polymerization, the resulting colorless, transparent, viscous solution was poured into a large amount of water, whereby the polymer precipitated in the form of a paste. After thoroughly washing the precipitate with water, it was dissolved in 900 ml of concentrated hydrochloric acid, and the resulting solution was poured into a large amount of methanol to precipitate it as PAA-HCl. The precipitate was collected by filtration, dried, again dissolved in 500 ml of concentrated hydrochloric acid and re-precipitated by pouring it into methanol. The precipitate was collected by filtration and extracted by means of Soxhlet extractor to remove the unpolymerized monomer and sulfuric acid. The precipitate was dried under reduced pressure at 50° C. to obtain 440 g (yield about 90%) of PAA-HCl. $\overline{M}_n$ of this polymer was 6,500.

EXAMPLE 5

Into 31 g of 60% aqueous solution of zinc chloride was dissolved 49 g (½ mole) of MAA-HCl synthesized by the procedure mentioned in Example 1. The solution was placed in a stoppered 100 ml Erlenmeyer flask and heated to 70° C. After replacing the air with nitrogen by blowing in nitrogen gas, 1.5 g of 2,2'-azo-bis(2-methyl-4-diethylamino)-butyronitrile dihydrochloride (Initiator-3) was added as a powder and dissolved, after which polymerization was carried out at a temperature of 70°±1° C. for 40 hours. After diluting the resulting viscous solution with 30 g of distilled water, it was into a large amount of methanol to precipitate the polymer. The precipitate was collected by filtration, extracted with methanol by means of Soxhlet extractor and then dried at 50° C. under reduced pressure to obtain 35 g (71%) of PAA-HCl. $\overline{M}_n$ of this polymer was about 8,000.

EXAMPLE 6

This is an example of polymerization in 85% phosphoric acid. Into the 2 liter polymerization vessel used in Example 1 equipped with a dropping funnel in place of the nitrogen gas inlet tube was dropped 1,150 g (10 moles) of 85% phosphoric acid, into which was also dropped 285 g (5 moles) of MAA with stirring. At this time, the temperature was kept at 10°–30° C. If the temperature exceeds 30° C., MAA can vaporize partially. If the temperature is lower than 10° C., phosphate of MAA deposits out as a crystal, which is inconvenient.

After the dropping, the mixture was heated to 50° C. with stirring. To the solution of MAA phosphate in phosphoric acid thus obtained was added a solution of 5.7 g of Initiator-2 in 30 ml of distilled water. Since generation of heat started about 2 hours after the addition of the initiator, the mixture was cooled and kept at 50°±2° C. and polymerized for 40 hours. After the polymerization, there was obtained a colorless, transparent, viscous solution. When this solution was poured into a large amount of water, a polymer precipitated. After thoroughly washing the precipitate with water, it was dissolved in 550 ml of concentrated hydrochloric acid, and the resulting solution was poured into a large amount of methanol to precipitate it in the form of PAA-HCl. The precipitate was collected by filtration and extracted by means of Soxhlet extractor to remove the unpolymerized monomer and phosphoric acid. Then the precipitate was dried under reduced pressure at 50° C. to obtain 417 g (ca. 85%) of PAA-HCl.

Number-average molecular weight $\overline{M}_n$ of this PAA-HCl, determined by the same procedure as in Example 1, was 45,000 (degree of polymerization: 480).

EXAMPLE 7

The procedure of Example 6 was repeated, except that 3,5-diamidinyl-1,2-diazo-1-cyclopentene dihydrochloride (Initiator-4) was used in place of Initiator-2 used in Example 6 and the temperature of polymerization was 70°±2° C. Thus, there was obtained 405 g (ca. 82%) of PAA-HCl ($\overline{M}_n$=36,000).

EXAMPLE 8

Into 196 g of 50% (by weight) aqueous solution of phosphoric acid was dropped 57 g of MAA with stirring while cooling the solution to 10°–15° C. After the dropping, water was distilled off by means of a rotary evaporator at 60° C. under a reduced pressure of 10 mm Hg to obtain 163 g of white-colored crystals of monoallylamine phosphate (MAA·H$_3$PO$_4$). This crystal contained about 5% water. Into 200 ml Erlenmeyer flask was introduced 82 g of this crystal, to which was added 37 g of distilled water to dissolve the crystal. After placing the flask in a thermostatted bath kept at 50° C., 1.2 g of Initiator-1 dissolved into 5 ml of distilled water was added and mixed uniformly. Then, polymerization was carried out for 48 hours in the thermostatted bath. After the polymerization, the resulting viscous solution was treated in the same manner as in Example 5 to obtain 36.8 g of PAA-HCl (e,ovs/M/$_n$=42,000).

The results of the polymerizations mentioned in Examples 1–8 are summarized in Table 1.

TABLE 1

| Example No. | Monomer (g) | Solvent (g) | Catalyst (g) | Temperature (°C.) | Time (hr) | Yield (g) (PAA—HCl)[h] | Yield (%) | $\overline{M}_n$[c] |
|---|---|---|---|---|---|---|---|---|
| 1 | MAA—HCl[a] 561 | Water 230 | Initiator-1[b] 14 | 50 ± 2 | 72 | 533 | 90 | 8,500 |
| 2 | MAA—HCl 561 | Water 230 | Initiator-2[d] 14 | 50 ± 2 | 72 | 503 | 85 | 7,500 |
| 3 | MAA—HCl 49 | 60% ZnCl₂ aq. 31 | Initiator-1 1.4 | 50 ± 1 | 40 | 47 | 96 | 9,500 |
| 4 | MAA 285 | 80% H₂SO₄ 613 | Initiator-1 8.6 | 50 ± 2 | 48 | 440 | 90 | 6,500 |
| 5 | MAA—HCl 49 | 60% ZnCl₂ aq. 31 | Initiator-3[e] 1.5 | 70 ± 1 | 40 | 35 | 71 | 8,000 |
| 6 | MAA 285 | 85% H₃PO₄ 1,150 | Initiator-2 5.7 | 50 ± 2 | 40 | 417 | 85 | 45,000 |
| 7 | MAA 285 | 85% H₃PO₄ 1,150 | Initiator-4[f] 5.7 | 70 ± 2 | 40 | 405 | 82 | 36,000 |
| 8 | MAA—H₃PO₄[g] 82 | Water 37 | Initiator-1 1.2 | 50 | 48 | 36.8 | 68 | 42,000 |

Notes
[a]MAA—HCl: Monoallylamine hydrochloride
[b]Initiator-1: 2,2'-Bis(N—phenylamidinyl)-2,2'-azopropane dihydrochloride
[c]INSERT RING Number-average molecular weight measured by osmometry in sodium chloride solution
[d]Initiator-2: 2,2'-Diamidinyl-2,2'-azopropane dihydrochloride
[e]Initiator-3: 2,2'-Azobis(2-methyl-4-diethyl-amino)-butyronitrile dihydrochloride
[f]Initiator-4: 3,5-Diamidinyl-1,2-diazo-1-cyclopentene dihydrochloride
[g]MAA—H₃PO₄: Monoallylamine phosphate
[h]PAA—HCl: Polyallylamine hydrochloride

Comparative Examples 1-11

MAA inorganic acid salts were subjected to polymerization treatment in various solvents by using, as catalyst, various radical initiators other than the radical initiators of this invention (Comparative Examples 1-9). In another run, MAA, not formed into inorganic acid salt, was directly subjected to polymerization treatment in the presence of the initiator used in this invention (Comparative Example 10). In yet another run, allyl alcohol, which is another allyl compound, was subjected to polymerization treatment in the presence of the initiator used in this invention (Comparative Example 11).

All these polymerization treatments were carried out in a stoppered 50 ml test tube in an atmosphere of nitrogen by standard polymerization procedure. After the polymerization treatment, the polymer was separated and purified by the procedure mentioned in the preceding examples and all the polymers were recovered in the form of PAA-HCl, provided that the extraction by means of Soxhlet extractor was not carried out. The results are summarized in the following Table 2.

TABLE 2

| Comparative Example No. | Monomer (g) | Solvent (g) | Catalyst (g) | Temperature (°C.) | Time (hr) | Yield (g) PAA—HCl[v] | Yield (%) | $\overline{M}_n$[c] | Note |
|---|---|---|---|---|---|---|---|---|---|
| 1 | MMA—HCl 9.35 | Water 6.25 | APS[m] 0.28 | 50 | 72 | <0.1 | | | Trace quantity of polymer |
| 2 | MMA—HCl 9.35 | DMSO[n] 6.25 | AIBN[o] 0.28 | 50 | 72 | <0.1 | | | Trace quantity of polymer |
| 3 | MAA—HCl 9.35 | DMSO/Water = 9/1 6.25 | APS 0.28 | 50 | 72 | 1.22 | 13.1 | <1,000 | |
| 4 | MAA—HCl 9.35 | DMF[p] 6.25 | CHP[q] 0.28 | 50 | 48 | 0.29 | 3.1 | <1,000 | |
| 5 | MAA 5.70 | 85% H₃PO₄ 23.1 | CHP 0.28 | 60 | 48 | 1.22 | 13.1 | 2,500 | |
| 6 | MAA 5.70 | 85% H₃PO₄ 23.1 | t-BHP[r] 0.28 | 50 | 48 | <0.1 | | | Trace quantity of polymer |
| 7 | MAA 5.70 | 85% H₃PO₄ 23.1 | CPAFA[s] 0.28 | 50 | 48 | <0.1 | | | Trace quantity of polymer |
| 8 | MAA 5.70 | 85% H₃PO₄ 23.1 | APS + Mohr's salt[t] 0.23 + 0.39 | 50 | 48 | 0.9 | 9.6 | <1,000 | Redox initiator |
| 9 | MAA 5.70 | 85% H₃PO₄ 23.1 | APS + NaHSO₃ 0.23 + 0.10 | 50 | 48 | 2.28 | 24.4 | 5,000 | Redox initiator |
| 10 | MAA 5.70 | Water 5.70 | Initiator-1[b] 0.28 | 50 (Ampoule, N₂ atmosphere) | 72 | | | | Trace quantity of polymer |
| 11 | AA[u] | 85% H₃PO₄ | Initiator-2[d] | 50 | 72 | | | | Trace quantity |

TABLE 2-continued

| Comparative Example No. | Monomer (g) | Solvent (g) | Catalyst (g) | Temperature (°C.) | Time (hr) | Yield (g) PAA—HCl[v] | Yield (%) | $\overline{M}_n$[c] | Note |
|---|---|---|---|---|---|---|---|---|---|
| | 58 | 115 | 2.9 | | | | | | of polymer |

Notes
[b]Initiator-1: 2,2'-Bis(N—phenylamidinyl)-2,2'-azopropane dihydrochloride
[c]$\overline{M}_n$: Number-average molecular weight measured by osmometry in sodium chloride solution
[d]Initiator-2: 2,2'- Diamidinyl-2,2'-azopropane dihydrochloride
[m]APS: Ammonium peroxysulfate
[n]DMSO: Dimethyl sulfoxide
[o]AIBN: Azobisisobutyronitrile
[p]DMF: Dimethylformamide
[q]CHP: Cumene hydroperoxide
[r]t-BHP: t-Butyl hydroperoxide
[s]CPAFA: 2-Cyano-2-propylazoformamide
[t]Mohr's salt: $FeSO_4(NH_4)_2SO_4 \cdot 6H_2O$
[u]AA: Allyl alcohol
[v]PAA—HCl: Polyallylamine hydrochloride As has been mentioned above in detail, the process of this invention obviously has a superiority to the conventionally employed radical polymerization processes.

By the process of this invention, there is provided an industrial process for producing polyallylamine for the first time.

What is claimed is:

1. A process for producing a homopolymer of an acid salt of monoallylamine which comprises polymerizing an inorganic acid salt of monoallylamine in a polar solvent selected from the group consisting of water, inorganic acids, aqueous solutions of inorganic acids, aqueous solutions of metallic salts of inorganic acids, organic acids, aqueous solutions of organic acids, alcohols, dimethylsulfoxide and dimethylformamide in the presence of a radical initiator which is an inorganic or organic acid salt of an azo compound, said inorganic or organic acid salt of said azo compound being selected from the group consisting of hydrochloride, sulfate, phosphate, alkylsulfate, para-toluene sulfonate, formate, acetate and propionate, said azo compound having the formula:

$$R_1—N=N—R_2$$

wherein at least one of $R_1$ and $R_2$ is a group containing a nitrogen atom cationizable in a polymerization medium and which is selected from the group consisting of aminoalkyl, aminoaryl, amidinylalkyl, aminoalkaryl, aminoaralkyl, amidinylalkaryl, cyanoaminoalkyl and cyanoaminoalkaryl.

2. A process in accordance with claim 1 wherein both $R_1$ and $R_2$ are groups containing a nitrogen atom cationizable in a polymerization medium.

3. A process in accordance with claim 1 wherein one of $R_1$ and $R_2$ is a cationizable nitrogen-containing group and the other is a group selected from the group consisting of alkyl, aryl, alkaryl, aralkyl, cyanoalkyl, cyanoaryl, cyanoalkaryl and cyanoaralkyl.

4. A process for producing homopolymers of acid salts of monoallylamine which comprises polymerizing an inorganic acid salt of monoallylamine in a polar solvent selected from the group consisting of water, inorganic acids, aqueous solutions of inorganic acids, aqueous solutions of metallic salts of inorganic acids, organic acids, aqueous solutions of organic acids, alcohols, dimethylsulfoxide and dimethylformamide in the presence of a radical initiator which is an inorganic or organic acid salt or an azo compound, said inorganic or organic acid salt of said azo compound being selected from the group consisting of hydrochloride, sulfate, phosphate, alkylsulfate, para-toluene sulfonate, formate, acetate and propionate, said azo compound having the formula

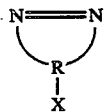

where R is alkylene, alkylalkylene or arylalkylene linked to said nitrogen atoms of said azo group to form a ring; and X is a group containing nitrogen atoms cationizable in a polymerization medium and which is selected from the group consisting of aminoalkyl, aminoaryl, amidinylalkyl, amidinylaryl, aminoalkaryl, aminoaralkyl, amidinylalkaryl, cyanoaminoalkyl and cyanoaminoalkaryl.

* * * * *